(12) United States Patent
Kitaura et al.

(10) Patent No.: US 10,720,663 B2
(45) Date of Patent: Jul. 21, 2020

(54) LAMINATED BATTERY MODULE

(71) Applicants: TOYOTA JIDOSHA KABUSHIKI KAISHA, Toyota-shi, Aichi-ken (JP); KYOHO MACHINE WORKS, LTD., Toyota-shi, Aichi-ken (JP)

(72) Inventors: Masayuki Kitaura, Susono (JP); Seigo Fujishima, Miyoshi (JP); Yukihiro Isogai, Toyota (JP); Masanori Kodera, Toyota (JP)

(73) Assignees: TOYOTA JIDOSHA KABUSHIKI KAISHA, Toyota-shi, Aichi-ken (JP); KYOHO MACHINE WORKS, LTD., Toyota-shi, Aichi-ken (JP)

( * ) Notice: Subject to any disclaimer, the term of this patent is extended or adjusted under 35 U.S.C. 154(b) by 99 days.

(21) Appl. No.: 15/943,788

(22) Filed: Apr. 3, 2018

(65) Prior Publication Data

US 2018/0294510 A1 Oct. 11, 2018

(30) Foreign Application Priority Data

Apr. 5, 2017 (JP) ................................. 2017-075300

(51) Int. Cl.
*H01M 10/052* (2010.01)
*H01M 10/613* (2014.01)
*H01M 10/647* (2014.01)
*H01M 10/6557* (2014.01)
*H01M 10/0562* (2010.01)
(Continued)

(52) U.S. Cl.
CPC ........... *H01M 10/052* (2013.01); *B32B 15/09* (2013.01); *H01M 4/13* (2013.01); *H01M 4/64* (2013.01); *H01M 10/0481* (2013.01); *H01M 10/0562* (2013.01); *H01M 10/613* (2015.04); *H01M 10/647* (2015.04); *H01M 10/6557* (2015.04);
(Continued)

(58) Field of Classification Search
None
See application file for complete search history.

(56) References Cited

U.S. PATENT DOCUMENTS 5,565,072 A * 10/1996 Faita ......................... C25B 9/10
204/256
2016/0093864 A1 3/2016 Nakamura et al.

FOREIGN PATENT DOCUMENTS

JP 2016039023 A 3/2016
JP 2016-091916 A 5/2016
(Continued)

*Primary Examiner* — Daniel S Gatewood
(74) *Attorney, Agent, or Firm* — Sughrue Mion, PLLC (57) ABSTRACT

Provided is a laminated battery module that is capable of imparting a minimum required restraining load to a battery laminate at a low temperature and a low charging rate, while also withstanding the load on the battery laminate at a high temperature and a high charging rate, without increasing the size of the restraining member. A laminated battery module 100 includes a battery laminate 15 containing one or more unit cells, a restraining member 20 containing a pair of end plates 21 located on both ends of the battery laminate 15 in the direction of lamination and tensioning members 22 that fasten the pair of end plates 21 mutually, and an elastic member 30 located between the pair of end plates 21; wherein, the elastic member 30 is composed of a material that undergoes a decrease in the elastic modulus thereof accompanying a rise in temperature from −30° C. to 80° C.

18 Claims, 5 Drawing Sheets

(51) Int. Cl.
  *H01M 4/13*      (2010.01)
  *H01M 4/64*      (2006.01)
  *B32B 15/09*     (2006.01)
  *H01M 10/04*     (2006.01)
  *H01M 4/02*      (2006.01)
  *H01M 10/0525*   (2010.01)

(52) U.S. Cl.
  CPC .. *H01M 10/0525* (2013.01); *H01M 2004/027* (2013.01); *H01M 2004/028* (2013.01)

(56) References Cited

FOREIGN PATENT DOCUMENTS

| | | | | |
|---|---|---|---|---|
| JP | 2016072039 A | | 5/2016 | |
| JP | 2016091916 A | * | 5/2016 | .............. H01M 2/10 |

\* cited by examiner

LAMINATED BATTERY MODULE

TECHNICAL FIELD

The present invention relates to a laminated battery module.

BACKGROUND ART

Laminated battery modules are known in which a battery laminate containing one or more cell units is interposed between metal plates or other restraining members and restrained at a prescribed load.

The volume of the battery laminate present in such laminated battery modules expands and contracts accompanying charging and discharging of the battery or changes in temperature, for example. Elastic members may be interposed between the battery laminate and metal plates, for example, for the purpose of preventing damage to the restraining members attributable to this expansion and contraction of the battery laminate.

For example, Patent Document 1 describes a battery module provided with a laminate containing a plurality of battery cells (unit cells) laminated along a prescribed direction, a restraining member, containing a pair of end plates respectively arranged on one end and the other end of the laminate in the prescribed direction, which applies a restraining load to the battery cells along the prescribed direction by fastening the end plates mutually, elastic members compressed accompanying expansion of the battery cells to which the restraining load is applied by the restraining member together with the battery cells, and a relief mechanism containing a relief space that allows a portion of the elastic members to fit therein when the elastic members have been compressed.

PRIOR ART DOCUMENTS

Patent Documents

[Patent Document 1] Japanese Unexamined Patent Publication No. 2016-91916

DISCLOSURE OF THE INVENTION

Problems to be Solved by the Invention

Expansion and contraction of a battery laminate is caused by both changes in volume accompanying charging and discharging and changes in volume accompanying a temperature change. The restraining member is required to be designed so as to be able to impart a minimum required restraining load during a low temperature and a low charging rate when the battery laminate has maximally contracted, while also being able to withstand the load during a high temperature and a high charging rate when the battery laminate has maximally expanded.

In the laminated battery module of the prior art, it is necessary to increase the size of the restraining member in order to satisfy the aforementioned requirements. According to a specific embodiment of Patent Document 1 in particular, since a middle plate is required in addition to the end plates for the restraining member, the increase in size of the restraining member is considerable.

The present invention was conceived in consideration of the aforementioned circumstances of the prior art. Thus, an object of the present invention is to provide a laminated battery module capable of imparting a minimum required restraining load to a battery laminate at a low temperature and a low charging rate, while also withstanding the load on the battery laminate at a high temperature and a high charging rate, without increasing the size of a restraining member.

Means for Solving the Problems

The present invention is as indicated below.

[1] A laminated battery module, including:
a battery laminate containing one or more unit cells having a negative electrode current collector layer, a negative electrode active material layer, a solid electrolyte layer, a positive electrode active material layer and a positive electrode current collector layer in this order;
a restraining member containing a pair of end plates located on both ends of the battery laminate in the direction of lamination and tensioning members that fasten the pair of end plates mutually; and
an elastic member located between the pair of end plates;
wherein, the elastic member is composed of a material that undergoes a decrease in the elastic modulus thereof accompanying a rise in temperature from −30° C. to 80° C.

[2] The laminated battery module described in [1], wherein, when the charging rate of the battery laminate is 15%, the restraining load at 80° C. is equal to or greater than the restraining load at −30° C.

[3] The laminated battery module described in [1] or [2], wherein, when the charging rate of the battery laminate is 90%, the restraining load at 80° C. is equal to or less than the restraining load at −30° C.

[4] The laminated battery module described in any of [1] to [3], wherein the elastic modulus of the elastic member at −30° C. is 100 MPa or more, and the elastic modulus at 80° C. is 75% or less of the elastic modulus at −30° C.

[5] The laminated battery module described in [4], wherein the elastic modulus of the elastic member at −30° C. is 200 MPa or more, and the elastic modulus at 80° C. is 65% or less of the elastic modulus at −30° C.

[6] The laminated battery module described in any of [1] to [5], wherein the elastic modulus of the elastic member at 80° C. is 200 MPa or less.

[7] The laminated battery module described in any of [1] to [6], wherein the elastic member is composed of a polyester elastomer.

[8] The laminated battery module described in any of [1] to [7], wherein the battery laminate contains a plurality of pouch batteries, and each of the pouch batteries has one or more of the unit cells enclosed within an outer casing.

Effects of the Invention

According to the present invention, a laminated battery module is provided, that is capable of imparting a minimum required restraining load to a battery laminate at a low temperature and a low charging rate, while also withstanding the load on the battery laminate at a high temperature and a high charging rate, without increasing the size of a restraining member.

BEST MODE FOR CARRYING OUT THE INVENTION

<Laminated Battery Module>

The laminated battery module of the present invention includes: a battery laminate containing one or more unit cells having a negative electrode current collector layer, a negative electrode active material layer, a solid electrolyte layer, a positive electrode active material layer and a positive electrode current collector layer in this order; a restraining member containing a pair of end plates located on both ends of the battery laminate in the direction of lamination and tensioning members that fasten the pair of end plates mutually; and an elastic member located between the pair of end plates; wherein, the elastic member is composed of a material that undergoes a decrease in the elastic modulus thereof accompanying a rise in temperature from −30° C. to 80° C.

In the laminated battery module of the present invention, when the charging rate of the battery laminate is 15%, the restraining load at 80° C. may be equal to or greater than the restraining load at −30° C., and when the charging rate of the battery laminate is 90%, the restraining load at 80° C. may be equal to or less than the restraining load at −30° C.

In the present description, the restraining load of the battery laminate when the charging rate thereof is 15% is referred to as the "minimum restraining load", while the restraining load of the battery laminate when the charging rate thereof is 90% is referred to as the "maximum restraining load". The minimum restraining load may be the restraining load of the battery laminate when the charging rate thereof is 15%, 10%, 5% or 0%. The maximum restraining load may be the restraining load of the battery laminate when the charging rate is 90%, 95% or 100%. In addition, a temperature range of −30° C. to 80° C. refers to the temperature range assumed by the present description to represent the usage environment of the laminated battery module.

By making the minimum restraining load of the battery laminate at 80° C. equal to or greater than the minimum restraining load at −30° C., even in the case the battery laminate has maximally contracted within a normally assumed temperature range, the minimum required restraining load can be imparted to the battery laminate. The minimum restraining load at −30° C. may be, for example, 1 MPa or more, 2 MPa or more, 4 MPa or more, 6 MPa or more, 8 MPa or more, 10 MPa or more, 12 MPa or more, or, 15 MPa or more.

On the other hand, by making the maximum restraining load of the battery laminate at 80° C. equal to or lower than the maximum restraining load at −30° C., since the maximum restraining load in the case the battery laminate has maximally expanded within a normally assumed temperature range is inhibited, the restraining load on the battery laminate can be withstood without having to excessively enlarge the restraining member. The maximum restraining load at 80° C. may be, for example, 100 MPa or less, 75 MPa or less, 50 MPa or less, 40 MPa or less, 30 MPa or less, or 25 MPa or less.

In the case of a conventionally known laminated battery module, if the minimum restraining load of the battery laminate at 80° C. is set to equal to or greater than the minimum restraining load at −30° C., the maximum restraining load of the battery laminate at 80° C. has exceeded the maximum restraining load at −30° C. This being the case, although it is possible to impart the minimum required restraining load when the battery laminate has maximally contracted, since the restraining load when the battery laminate has maximally expanded cannot be inhibited, it becomes necessary to increase the size of the restraining member.

On the other hand, in the case of a conventionally known laminated battery module, if the maximum restraining load of the battery laminate at 80° C. is set to be equal to or less than the maximum restraining load at −30° C., the minimum restraining load of the battery laminate at 80° C. has been less than the minimum restraining load at −30° C. This being the case, although it is not necessary to increase the size of the restraining member since the restraining load when the battery laminate has maximally expanded is inhibited, the minimum required restraining load cannot be imparted, thereby leading to a decrease in battery performance.

A laminated battery module is not conventionally known in which the minimum restraining load of the battery laminate at 80° C. is equal to or greater than the minimum restraining load at −30° C. and the maximum restraining load of the battery laminate at 80° C. is equal to or less than the maximum restraining load at −30° C.

The laminated battery module of the present invention may also satisfy the aforementioned requirements simultaneously. Thus, the laminated battery module of the present invention may also be that which is capable of imparting a minimum required restraining load to a battery laminate at a low temperature and a low charging rate in addition to withstanding the load on the battery laminate at a high temperature and a high charging rate, without increasing the size of the restraining member.

The following provides an explanation of each component composing the laminated battery module of the present invention by using as an example a preferred embodiment (to be referred to as the "present embodiment") thereof. However, the present invention is not limited to the following embodiment.

<Battery Laminate>

The battery laminate in the laminated battery module of the present embodiment contains one or more unit cells having a negative electrode current collector layer, a negative electrode active material layer, a solid electrolyte layer, a positive electrode active material layer and a positive electrode currently collector layer in this order.

The battery laminate may adopt a configuration in which adjacent unit cells share a negative electrode current collector layer, a negative electrode active material layer or both. The battery laminate may also have two types of unit cells laminated in reverse order from front to back in the manner of, for example, a negative electrode current collector layer, negative electrode active material layer, solid electrolyte layer, positive electrode active material layer, positive electrode current collector layer, positive electrode active material layer, solid electrolyte layer, negative electrode active material layer and negative electrode current collector layer, while sharing the positive electrode current collector layer.

The battery laminate may also be an all-solid-state battery laminate.

Figure 1:
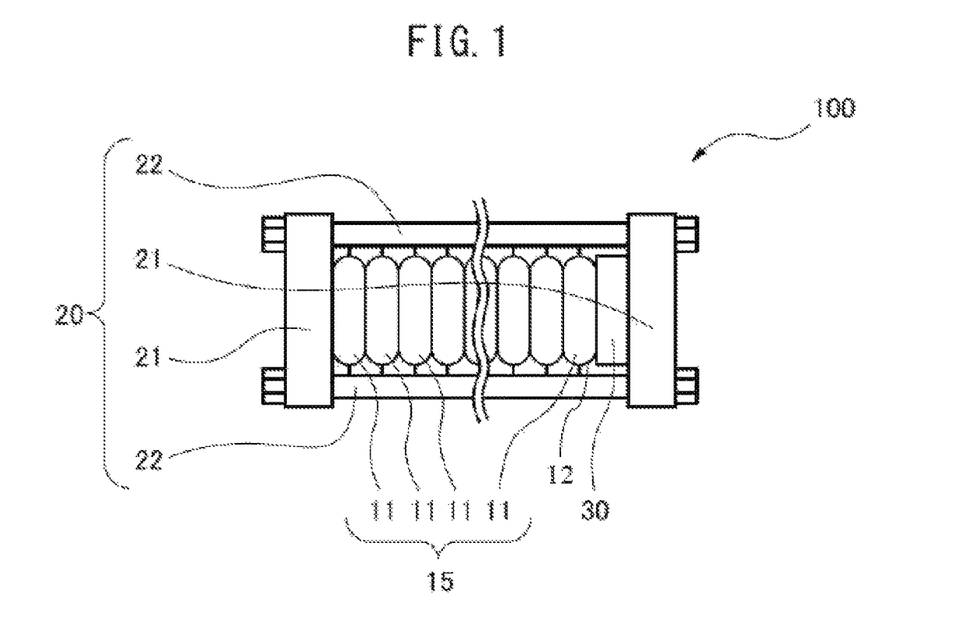
FIG. 1 is a schematic diagram for explaining the structure of one example of the laminated battery module of the present invention.

The battery laminate may also be a battery laminate containing a plurality of pouch batteries. As shown in FIG. 1, each of the laminated batteries 11 may have one or more unit cells enclosed within the outer casing 12 thereof. The outer casing 12 may be composed of, for example, aluminum laminated film.

<Restraining Member>

The restraining member in the laminated battery module of the present embodiment contains a pair of end plates located on both ends of the battery laminate in the direction of lamination and tensioning members that fasten the pair of end plates mutually.

The end plates may be in the form of, for example, rectangular flat plates. The size of the rectangular end plates may be larger than the area in the planar direction of the battery laminate.

The end plates preferably do not have through-hole or recessed part at least in the region that contacts the battery laminate. As a result of the end plates having such form, elasticity of an elastic member to be subsequently described is able to act effectively on the battery laminate over a wide temperature range from, for example, $-30°$ C. to $80°$ C. As a result, in addition to being able to impart a minimum required restraining load to the battery laminate at a low temperature and a low charging rate, the elastic member is able to withstand the load on the battery laminate at a high temperature and a high charging rate, thereby making this preferable.

In addition, as a result of the end plates not having through-hole or recessed part at least in the region that contacts the battery laminate, it is not necessary to install another member, such as a middle plate, in order to apply a uniform restraining load to the battery laminate. As a result, increasing the size of the restraining member can be avoided, thereby making this preferable.

The tensioning members may be composed of, for example, a long bolt and nuts able to be threaded onto this bolt.

The bolt may be inserted through the end plates in an extending portion of the end plates. A restraining load may be applied to the battery laminate by threading nuts onto both ends of the inserted bolt from the outer side of the end plate.

<Elastic Member>

The elastic member is composed of a material that undergoes a decrease in the elastic modulus thereof accompanying a rise in temperature from $-30°$ C. to $80°$ C. In the present description, elastic modulus refers to the compressive elastic modulus as measured in accordance with JIS K7181 under conditions described in the examples to be subsequently described.

As a result of the elastic member being composed of a material exhibiting a temperature-dependent elastic modulus as described above, the minimum restraining load of the battery laminate at $80°$ C. can be set to be equal to or greater than the minimum restraining load of the battery laminate at $-30°$ C.

From the viewpoint of effectively demonstrating the aforementioned effect, the elastic modulus at $80°$ C. of the material that composes the elastic member is 75% or less or 65% or less of the elastic modulus at $-30°$ C.

Moreover, in order to inhibit increases in the size of the laminated battery module while imparting the minimum required restraining load to the battery laminate regardless of the ambient temperature or charging state thereof, the elastic modulus at $-30°$ C. of the material that composes the elastic member may be, for example, 100 MPa or more, 150 MPa or more, 200 MPa or more, or 250 MPa or more. For the same reason, the elastic modulus at $80°$ C. of the material that composes the elastic member may be, for example, 25 MPa or more, 50 MPa or more, 75 MPa or more, or 100 MPa or more.

On the other hand, in order to ensure that excessive restraining load is not applied to the battery laminate regardless of the ambient temperature or charging state thereof, the elastic modulus at $80°$ C. of the material that composes the elastic member may be 200 MPa or less, 180 MPa or less, or 150 MPa or less. For the same reason, the elastic modulus at $-30°$ C. of the material that composes the elastic member may be, for example, 1,000 MPa or less, 900 MPa or less, 800 MPa or less, 700 MPa or less, or 600 MPa or less.

The material that composes the elastic member is preferably such that
the elastic modulus at $-30°$ C. is 100 MPa or more and the elastic modulus at $80°$ C. is 75% or less of the elastic modulus at $-30°$ C., or
the elastic modulus at $-30°$ C. is 200 MPa or more and the elastic modulus at $80°$ C. is 65% or less of the elastic modulus at $-30°$ C.

More specifically, the elastic modulus of the elastic member may be suitably set according to, for example, the size of the battery laminate, the degree of expansion and contraction, or the thickness of the elastic member. Which range of elastic modulus at $80°$ C. should be demonstrated by a material demonstrating a specific elastic modulus at $-30°$ C. to ensure a preferable elastic member for use in the present embodiment can be determined according to, for example, the following discussion.

For example, a laminated battery module is assumed in which a laminate composed of a battery laminate in a discharges state having a specific configuration and an elastic member having a specific thickness are restrained by a restraining member and a minimum required restraining load is applied at $-30°$ C. The elastic modulus at $-30°$ C. of the elastic member at this time is assumed to have a specific value. The elastic modulus of the elastic member is then determined such that the restraining load in the case of having increased the temperature of the laminate from $-30°$ C. to $80°$ C. while still in the discharged state is equal to the restraining load at $-30°$ C. This value may be the preferable lower limit value of the elastic modulus at $80°$ C. when the aforementioned specific value is used for the elastic modulus at $-30°$ C. of the elastic member used in this laminated battery module.

Next, the restraining load of the laminate is determined for the aforementioned laminated battery module when in the charged state at $-30°$ C. The elastic modulus of the elastic member is then determined such that the restraining load in the case of having increased the temperature of the laminate from $-30°$ C. to $80°$ C. while still in the charged state is equal to the restraining load at $-30°$ C. This value may be the preferable upper limit value of the elastic modulus at 80° C. when the aforementioned specific value is used for the elastic modulus at −30° C. of the elastic member used in this laminated battery module.

The relationship between the elastic modulus at −30° C. and the elastic modulus at 80° C., namely the range (upper and lower limits) of the elastic modulus at 80° C. relative to the elastic modulus at −30° C., can be determined for an elastic member of a specific thickness in a specific laminated battery module by repeating the aforementioned calculations while incrementally changing the specific value of the elastic modulus at −30° C.

The elastic member may be selected from materials such as urethane, ethylene propylene rubber, ethylene propylene diene rubber, chloroprene rubber, silicon rubber or polyester elastomers that undergo a decrease in elastic modulus accompanying an increase in temperature from −30° C. to 80° C., and for which the minimum restraining load of the battery laminate at 80° C. can be made to be equal to or greater than the minimum restraining load at −30° C. and the maximum restraining load of the battery laminate at 80° C. can be made to be equal to or less than the maximum restraining load at −30° C. The material of the elastic member is particularly preferably a polyester elastomer. The polyester elastomer may have, for example, a hard segment (such as a crystal phase) and a soft segment (such as an amorphous phase). An example of a commercially available produce of such a polyester elastomer is a product manufactured under the trade name "Hytrel" by Dupont-Toray Co., Ltd.

The elastic member may be a solid body that does not contain air bubbles.

The elastic member may be, for example, a rectangular flat plate. The size of the rectangular elastic member may be equal to or larger than the area in the planar direction of the battery laminate.

The elastic member is located between the pair of end plates.

The elastic member may be arranged at an intermediate location of the battery laminate, namely between two adjacent unit cells in the battery laminate, or may be arranged between the end of the battery laminate and one of the end plates. Moreover, the elastic member may be separately arranged at a plurality of these locations.

FIG. 1 shows the structure of one example of the laminated battery module of the present embodiment.

The laminated battery module of FIG. 1 includes a battery laminate 15 containing a plurality of pouch batteries 11, a restraining member 20 containing a pair of end plates 21 located on both ends of the battery laminate 15 in the direction of lamination and tensioning members 22 that fasten the pair of end plates 21 mutually, and an elastic member 30 located between one of the end plates 21 and both ends of the battery laminate 15 in the direction of lamination.

<Constituent Materials of Each Layer of Battery Laminate>

As was previously described, the battery laminate in the laminated battery module of the present embodiment contains one or more unit cells having a negative electrode current collector layer, negative electrode active material layer, solid electrolyte layer, positive electrode active material layer and positive electrode current collector layer in this order. Each of the layers that compose the battery laminate may be composed of a known material. The following lists non-limiting examples of the constituent materials of each layer that composes the battery laminate.

[Negative Electrode Current Collector Layer]

The negative electrode current collector layer may be a foil composed of, for example, stainless steel (SUS), Cu, Ni, Fe, Ti, Co or Zn.

[Negative Electrode Active Material Layer]

The negative electrode active material layer at least contains a negative electrode active material, and may further contain a solid electrolyte, binder or conductive material and the like.

A known negative electrode active material such as graphite or silicon can be suitably used for the negative electrode active material in the negative electrode active material layer.

A sulfide-based solid electrolyte can be preferably used for the solid electrolyte in the negative electrode active material layer, and specific examples thereof include mixtures of $Li_2S$ and $P_2S_5$ (and the mixing weight ratio thereof is preferably such that $Li_2S:P_2S_5$=50:50 to 100:0, and particularly preferably such that $Li_2S:P_2S_5$ is 70:30).

A fluorine atom-containing resin represented by polyvinylidene fluoride (PVDF), for example, can be used as binder in the negative electrode active material layer.

Examples of the conductive material in the negative electrode active material layer include known conductive materials such as carbon nanofibers (e.g., VGCF manufactured by Showa Denko K.K.) or acetylene black.

[Solid Electrolyte Layer]

The solid electrolyte layer at least contains a solid electrolyte and preferably may further contain a binder.

The solid electrolytes previously described as being able to be used in the negative electrode active material layer can be used for the solid electrolyte in the solid electrolyte layer.

Butadiene rubber (BR) is preferable for the binder in the solid electrolyte layer.

[Positive Electrode Active Material Layer]

The positive electrode active material layer at least contains a positive electrode active material, and may further contain a solid electrolyte, binder or conductive material and the like.

A known positive electrode active material such as lithium cobalt oxide or ternary lithium oxide can be used for the positive electrode active material.

Materials previously respectively described as being able to be used in the negative electrode active material layer can be used as materials for the solid electrolyte, binder and conductive material in the positive electrode active material layer.

[Positive Electrode Current Collector Layer]

Foil composed of a material such as SUS, Ni, Cr, Au, Pt, Al, Fe, Ti or Zn can be used for the material composing the positive electrode current collector layer.

EXAMPLES

In the following examples and comparative examples, the elastic modulus of each member is the compressive elastic modulus as measured in accordance with JIS K7181 under the conditions indicated below.

Sample shape and size: Rectangular plate measuring 50 mm×50 mm×10 mm

Load measuring range: 0 MPa to 25 MPa

Testing speed: 0.06 mm/min

Example 1

48 pouch batteries was prepared. Each pouch battery had a thickness of 8.54 mm, and was obtained by laminating a plurality of all-solid-state unit cells, having a positive electrode current collector layer, positive electrode active material layer, solid electrolyte layer, negative electrode active material layer and negative electrode current collector layer in this order, and enclosing in an outer casing. The elastic modulus of the pouch batteries and the configuration of each layer in the pouch batteries were as indicated below.

[Elastic Modulus]
At a charging rate of 15%:
−30° C.: 1,790 MPa
80° C.: 2,330 MPa
At a charging rate of 90%:
−30° C.: 1,790 MPa
80° C.: 2,500 MPa
[Layer Configurations]
Positive electrode current collector layer: Al foil
Positive electrode active material layer: Containing ternary lithium oxide, solid electrolyte and vapor grown carbon fiber as conductive assistant
Solid electrolyte layer: Containing Li, P and S
Negative electrode active material layer: Containing carbon material and solid electrolyte
Negative electrode current collector layer: Cu foil An elastic member was prepared in the shape of a rectangular plate having a thickness of 40 mm. A polyester elastomer manufactured under the trade name "Hytrel 5557" by Dupont-Toray Co., Ltd. was used for the material of the elastic member. Values for the elastic modulus of "Hytrel 5557" are as indicated below.

−40° C.: 332 MPa
−30° C.: 294 MPa
−20° C.: 255 MPa
0° C.: 207 MPa
23° C.: 181 MPa
80° C.: 118 MPa
120° C.: 87 MPa

A laminated battery module 100 for use in the example and having the structure shown in FIG. 1 was produced using the aforementioned pouch batteries, elastic member and tensioning members. Namely, 48 pouch batteries 11 were laminated to obtain a battery laminate 15, and a laminate obtained by arranging an elastic member 30 on the end thereof in the direction of lamination was interposed between two end plates 21. The two end plates 21 were fixed in position on both sides of the laminate by linking with the bolts of two tensioning members 22 to obtain a restraining member 20, and an initial restraining load of 20.0 MPa was applied at a charging rate of 60% and temperature of 25° C. The contact area between the elastic member 30 and the pouch batteries 11 in the resulting laminated battery module 100 was 15,900 mm². The materials of the end plates 21 and tensioning members 22 were as indicated below.

End plates: S45C mechanical structural carbon steel, thickness: 20 mm
Tensioning members: A6061 corrosion-resistant Al alloy, diameter: 9 mm Values for total module length and restraining load of the laminated battery module 100 produced in the manner described above were determined by calculation over a temperature range of −30° C. to 80° C. and charging rate range of 15% to 90%. These ranges for temperature and charging rate were assumed to be the ranges over which the battery would normally be used. The results are shown in FIG. 2.

Figure 2:
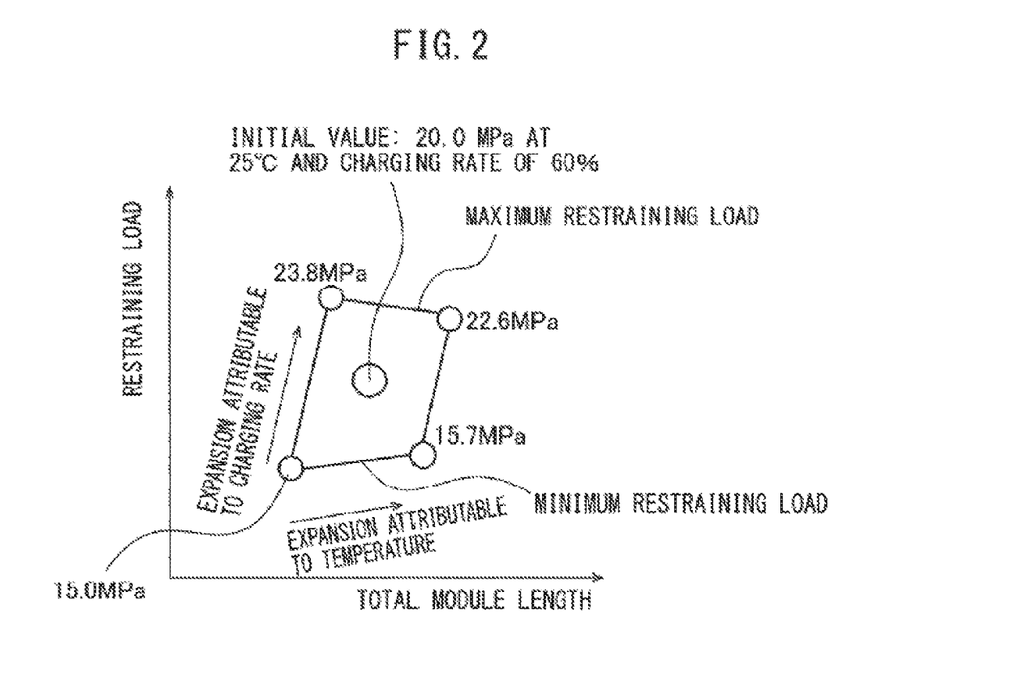
FIG. 2 is a graph indicating the relationship between restraining load and total module length of a laminated battery module obtained in Example 1.

In the quadrangle shown in FIG. 2, the lower left point indicates the value at −30° C. and charging rate of 15%, the upper left point indicates the value at −30° C. and charging rate of 90%, the lower right point indicates the value at 80° C. and charging rate of 15%, and the upper right point indicates the value at 80° C. and charging rate of 90%. As shown in FIG. 2, in the case of this laminated battery module 100, the minimum restraining load at 80° C. was larger than the minimum restraining load at −30° C. and the maximum restraining load at 80° C. was smaller than the maximum restraining load at −30° C.

Comparative Example 1

Figure 3:
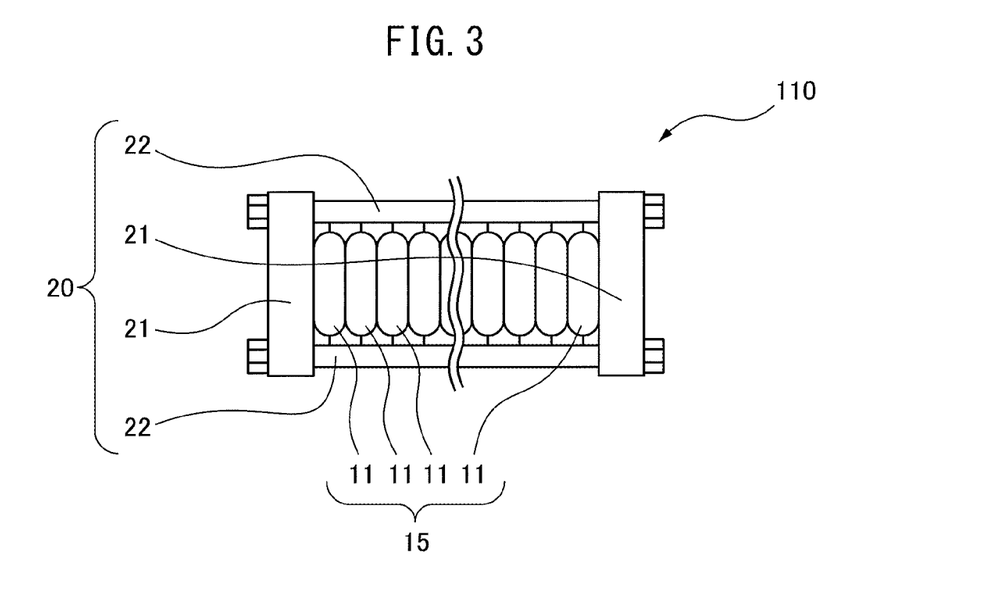
FIG. 3 is a schematic diagram for explaining the structure of a laminated battery module produced in Comparative Example 1.

A laminated battery module 110 for use in a comparative example and having the structure shown in FIG. 3 was produced in the same manner as Example 1 with the exception of not using an elastic member. In the laminated battery module 110 of FIG. 3, 48 pouch batteries 11 were laminated, the resulting battery laminate 15 was interposed between two end plates 21, the two end plates 21 were linked by fastening with the bolts of two tensioning members 22 to obtain a restraining member 20, and the battery laminate 15 was interposed by this restraining member 20.

The initial restraining load at a charging rate of 60% and temperature of 25° C. was 24.0 MPa.

Values for total module length and restraining load of the laminated battery module 110 produced in the manner described above were determined by calculation over a temperature range of −30° C. to 80° C. and charging rate range of 15% to 90%. The results are shown in FIG. 4.

Figure 4:
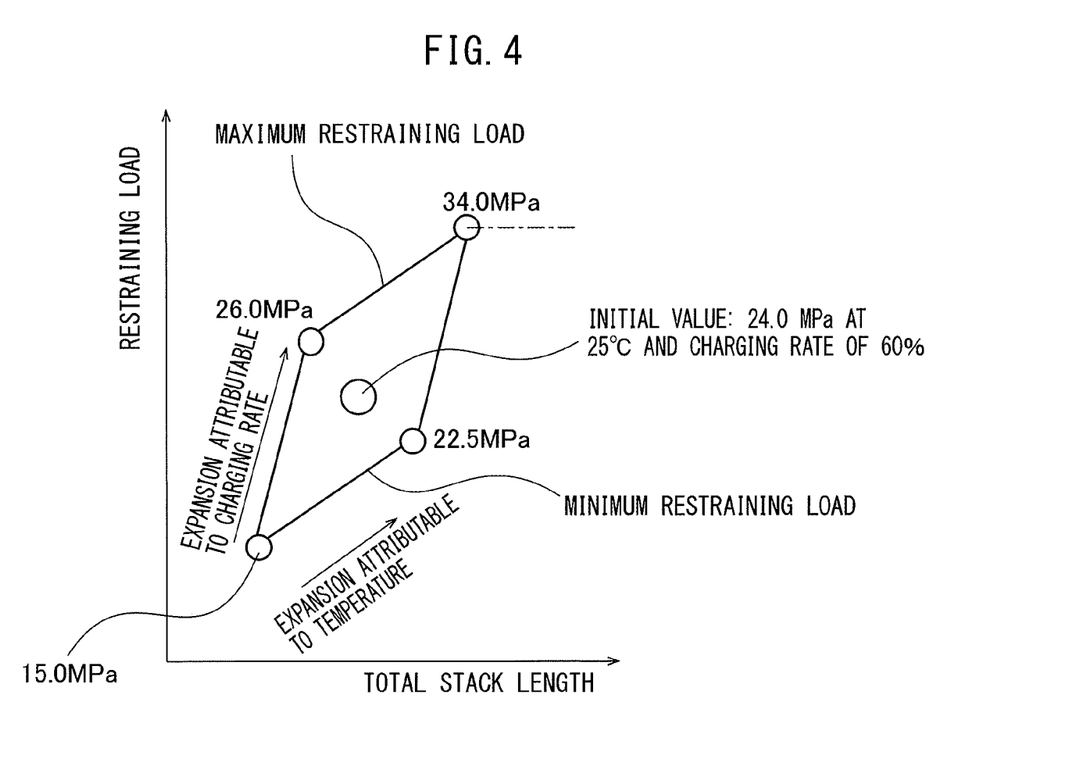
FIG. 4 is a graph indicating the relationship between restraining load and total module length of a laminated battery module obtained in Comparative Example 1.

As shown in FIG. 4, in this laminated battery module 110, although the minimum restraining load at 80° C. was larger than the minimum restraining load at −30° C., the maximum restraining load at 80° C. was larger than the maximum restraining load at −30° C.

Discussion of Example and Comparative Example

In the laminated battery module of Comparative Example 1 shown in FIG. 4, the maximum restraining load at 80° C. was determined to be significantly larger than the maximum restraining load at −30° C., and a load applied to the restraining member under these conditions was determined to be excessively large.

In contrast, in the laminated battery module of Example 1 shown in FIG. 2, in addition to being able to impart a minimum required restraining load to the battery laminate at a low temperature and a low charging rate, since the load of the battery laminate at a high temperature and a high charging rate is inhibited, this laminated battery module can be applied for practical use without requiring the use of a large restraining member, thereby verifying that the size of the battery can be reduced.

Reference Example

Figure 5:
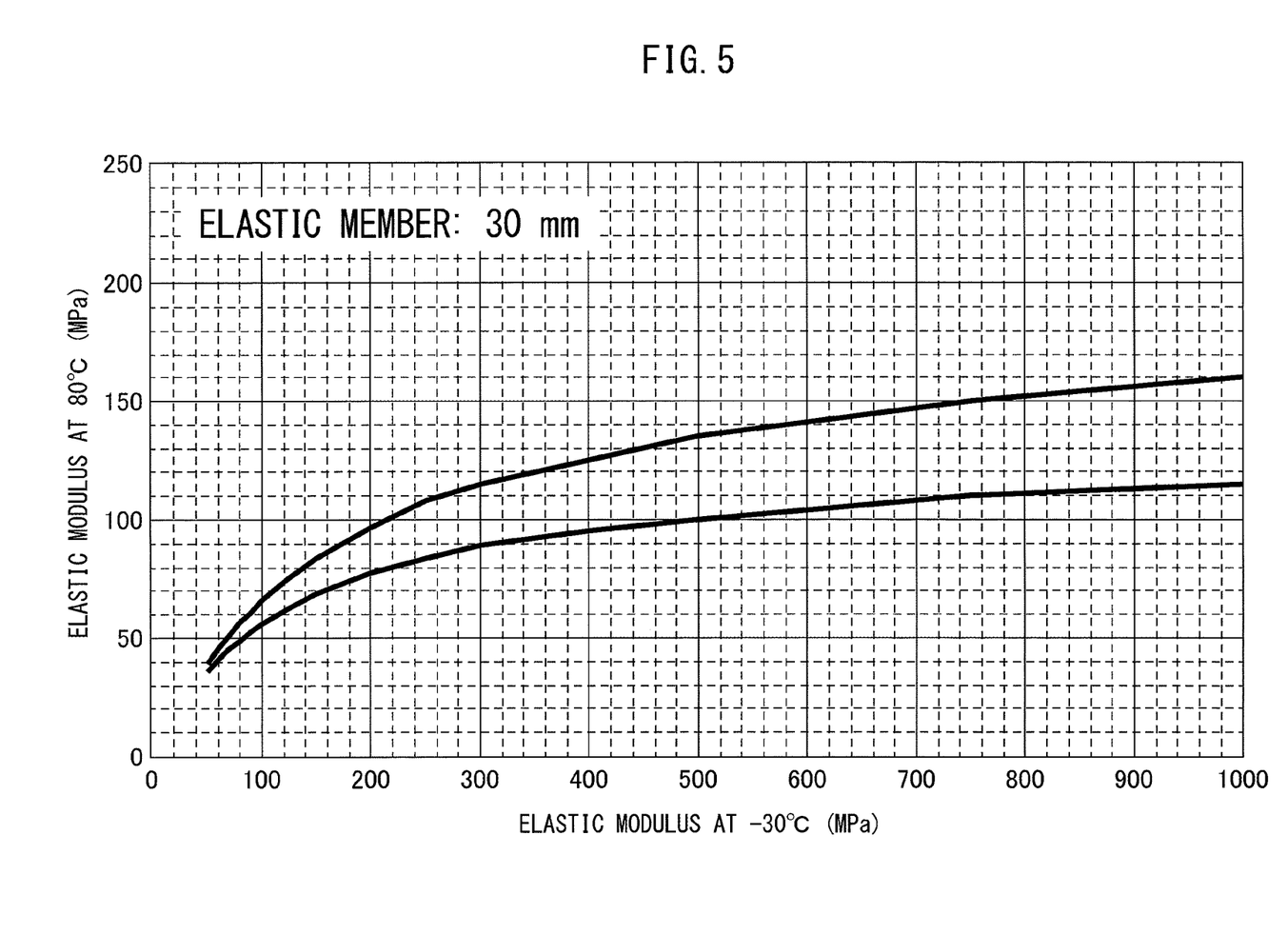
FIG. 5 is a graph indicating the preferable range of the relationship between elastic modulus at 80° C. and elastic modulus at −30° C. of a material composing an elastic member (thickness: 30 mm).
Figure 6:
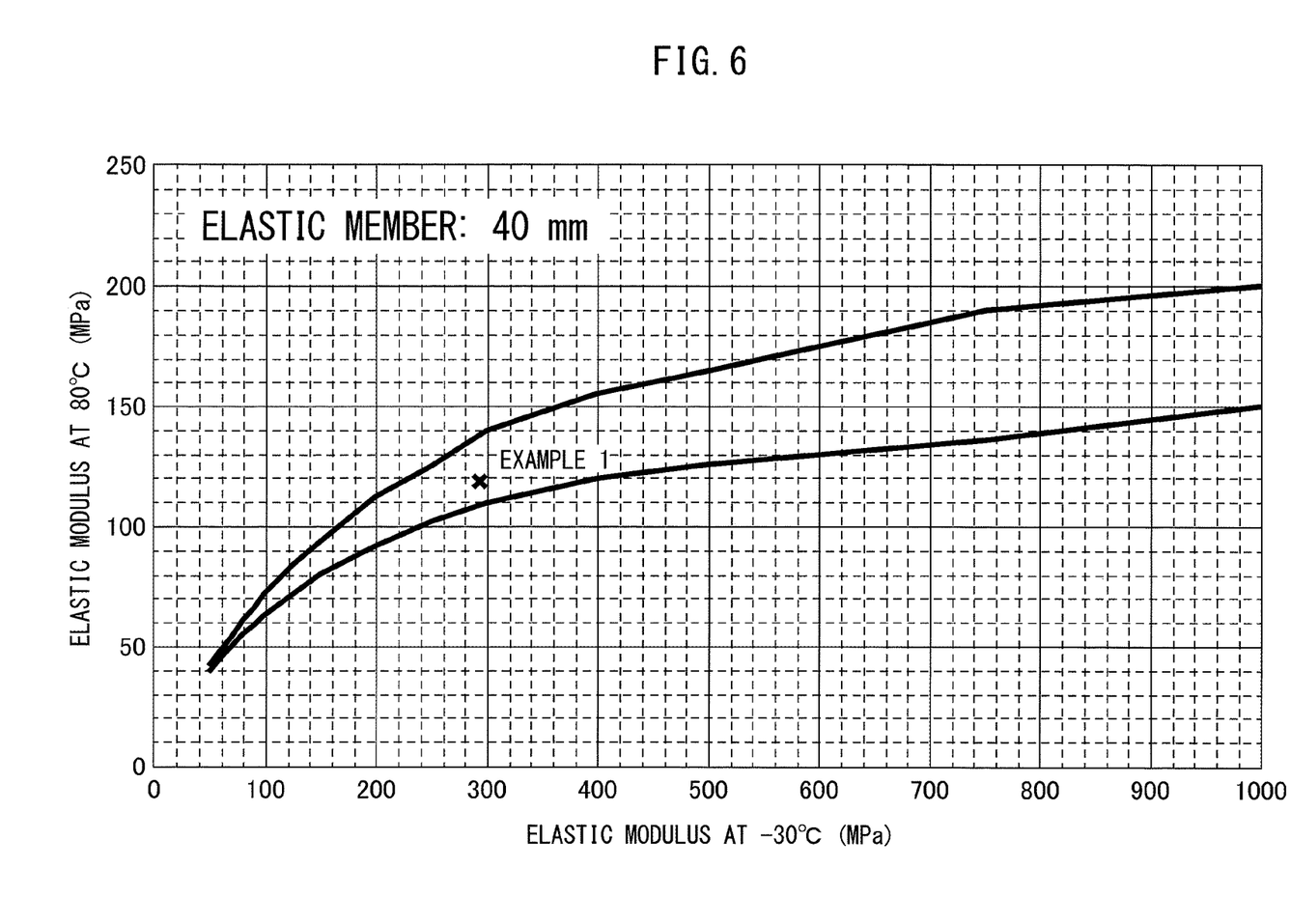
FIG. 6 is a graph indicating the preferable range of the relationship between elastic modulus at 80° C. and elastic modulus at −30° C. of a material composing an elastic member (thickness: 40 mm).
Figure 7:
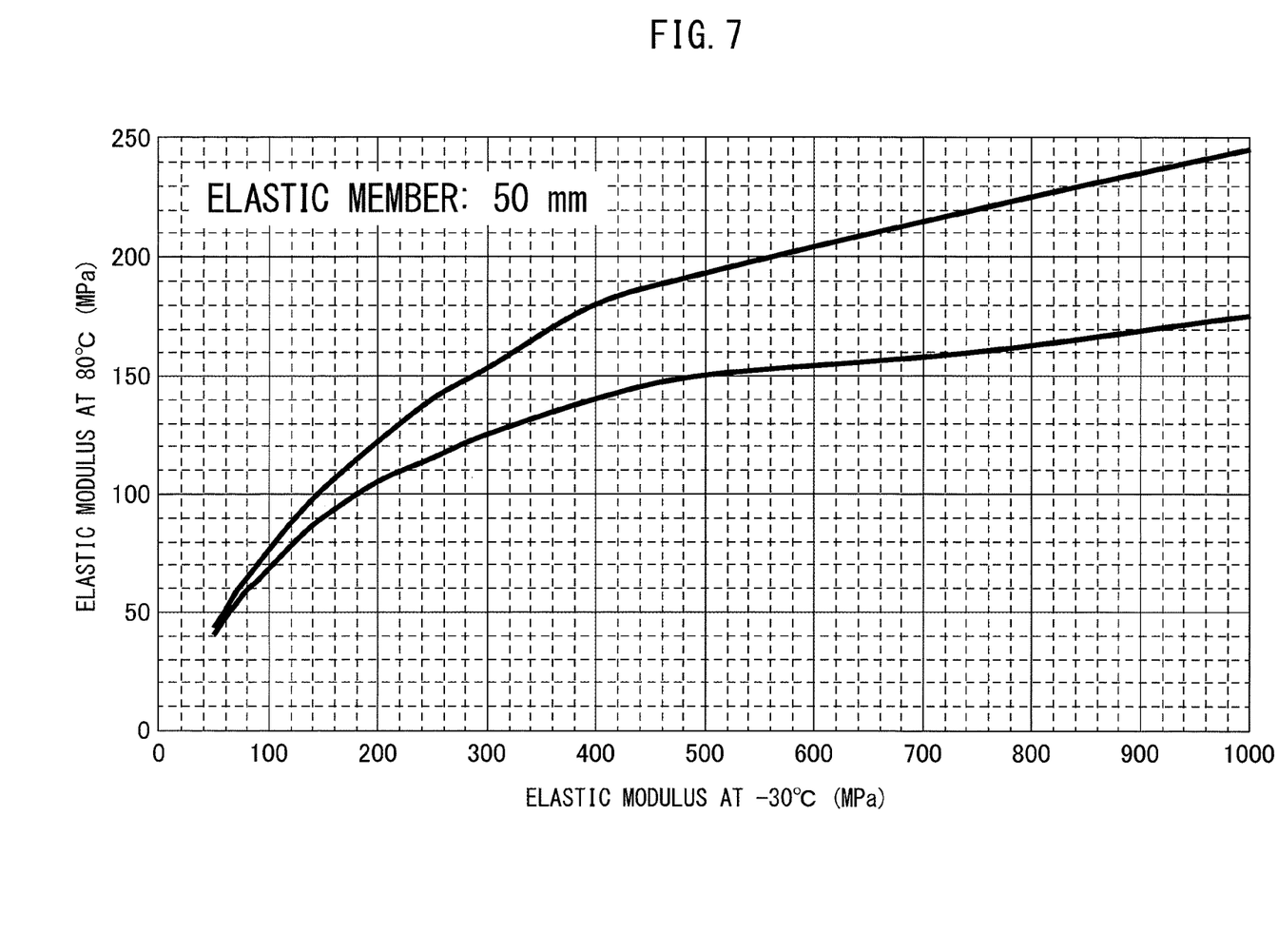
FIG. 7 is a graph indicating the preferable range of the relationship between elastic modulus at 80° C. and elastic modulus at −30° C. of a material composing an elastic member (thickness: 50 mm).

FIGS. 5 to 7 indicate graphs depicting the results of simulating the range of the preferable relationship between elastic modulus at 80° C. and elastic modulus at −30° C. in the case of having changed the thickness of the elastic member in the battery laminate used in Example 1. FIG. 5 depicts the case of an elastic member thickness of 30 mm, FIG. 6 depicts the case of an elastic member thickness of 40 mm, and FIG. 7 depicts the case of an elastic member thickness of 50 mm. In FIGS. 5 to 7, the region between the two solid lines indicates the preferable range of the relationship between elastic modulus at −30° C. and elastic modulus at 80° C. A person with ordinary skill in the art would be able to suitably set the elastic modulus at 80° C.

and the elastic modulus at −30° C. and select the material that composes the elastic member by referring to these drawings.

Furthermore, when the elastic member is separately arranged at a plurality of locations, the thickness of the elastic member as depicted in FIGS. 5 to 7 is considered to be the total thickness of the plurality of separately arranged elastic members.

BRIEF DESCRIPTION OF THE REFERENCE SYMBOLS

11 Pouch battery
15 ALL-solid-state battery laminate
20 Restraining member
21 End plate
22 Tensioning member
30 Elastic member
100 Laminated battery module
110 Laminated battery module of comparative example 1

The invention claimed is:

1. A laminated battery module, comprising:
a battery laminate containing one or more unit cells having a negative electrode current collector layer, a negative electrode active material layer, a solid electrolyte layer, a positive electrode active material layer and a positive electrode current collector layer in this order;
a restraining member containing a pair of end plates located on both ends of the battery laminate in the direction of lamination and tensioning members that fasten the pair of end plates mutually; and
an elastic member located between the pair of end plates;
wherein, the elastic member is composed of a material that undergoes a decrease in an elastic modulus thereof accompanying a rise in temperature from −30° C. to 80° C., and
the end plates do not have a through-hole or a recessed part in the region that contacts the battery laminate.

2. The laminated battery module according to claim 1, wherein, when a charging rate of the battery laminate is 15%, the restraining load at 80° C. is equal to or greater than a restraining load at −30° C.

3. The laminated battery module according to claim 1, wherein, when a charging rate of the battery laminate is 90%, the restraining load at 80° C. is equal to or less than a restraining load at −30° C.

4. The laminated battery module according to claim 1, wherein the elastic modulus of the elastic member at −30° C. is 100 MPa or more, and the elastic modulus at 80° C. is 75% or less of the elastic modulus at −30° C.

5. The laminated battery module according to claim 4, wherein the elastic modulus of the elastic member at −30° C. is 200 MPa or more, and the elastic modulus at 80° C. is 65% or less of the elastic modulus at −30° C.

6. The laminated battery module according to claim 1, wherein the elastic modulus of the elastic member at 80° C. is 200 MPa or less.

7. The laminated battery module according to claim 1, wherein the elastic member is composed of a polyester elastomer.

8. The laminated battery module according to claim 1, wherein the battery laminate contains a plurality of pouch batteries, and each of the pouch batteries has one or more of the unit cells enclosed within an outer casing.

9. The laminated battery module according to claim 2, wherein, when the charging rate of the battery laminate is 90%, the restraining load at 80° C. is equal to or less than the restraining load at −30° C.

10. The laminated battery module according to claim 2, wherein the battery laminate contains a plurality of pouch batteries, and each of the pouch batteries has one or more of the unit cells enclosed within an outer casing.

11. The laminated battery module according to claim 3, wherein the battery laminate contains a plurality of pouch batteries, and each of the pouch batteries has one or more of the unit cells enclosed within an outer casing.

12. The laminated battery module according to claim 4, wherein the battery laminate contains a plurality of pouch batteries, and each of the pouch batteries has one or more of the unit cells enclosed within an outer casing.

13. The laminated battery module according to claim 5, wherein the battery laminate contains a plurality of pouch batteries, and each of the pouch batteries has one or more of the unit cells enclosed within an outer casing.

14. The laminated battery module according to claim 6, wherein the battery laminate contains a plurality of pouch batteries, and each of the pouch batteries has one or more of the unit cells enclosed within an outer casing.

15. The laminated battery module according to claim 7, wherein the battery laminate contains a plurality of pouch batteries, and each of the pouch batteries has one or more of the unit cells enclosed within an outer casing.

16. The laminated battery module according to claim 9, wherein the battery laminate contains a plurality of pouch batteries, and each of the pouch batteries has one or more of the unit cells enclosed within an outer casing.

17. The laminated battery module according to claim 1, wherein the elastic member does not contain air bubbles.

18. A laminated battery module, comprising:
a battery laminate containing one or more unit cells having a negative electrode current collector layer, a negative electrode active material layer, a solid electrolyte layer, a positive electrode active material layer and a positive electrode current collector layer in this order;
a restraining member containing a pair of end plates located on both ends of the battery laminate in the direction of lamination and tensioning members that fasten the pair of end plates mutually; and
an elastic member located between the pair of end plates;
wherein, the elastic member is composed of a material that undergoes a decrease in an elastic modulus thereof accompanying a rise in temperature from −30 to 80° C., and
a thickness of the elastic member is 40 mm-50 mm.

* * * * *